(12) United States Patent
Ferreira

(10) Patent No.: US 12,723,667 B2
(45) Date of Patent: Sep. 1, 2026

(54) REGULATOR FOR CONTROLLING THE FLOW OF CARBONATED BEVERAGES

(71) Applicant: Flavio Henn Ferreira, São Paulo (BR)

(72) Inventor: Flavio Henn Ferreira, São Paulo (BR)

( * ) Notice: Subject to any disclaimer, the term of this patent is extended or adjusted under 35 U.S.C. 154(b) by 0 days.

(21) Appl. No.: 18/577,119

(22) PCT Filed: Jun. 21, 2022

(86) PCT No.: PCT/BR2022/050228
§ 371 (c)(1),
(2) Date: Jan. 5, 2024

(87) PCT Pub. No.: WO2023/245262
PCT Pub. Date: Dec. 28, 2023

(65) Prior Publication Data

US 2024/0208792 A1 Jun. 27, 2024

(51) Int. Cl.
*B67D 1/14* (2006.01)
*F16K 15/06* (2006.01)

(52) U.S. Cl.
CPC ................ *F16K 15/06* (2013.01); *B67D 1/14* (2013.01); *B67D 2210/00128* (2013.01)

(58) Field of Classification Search
CPC ............. B67D 1/14; B67D 2210/00128; F16F 1/3732; F16K 15/026; F16K 17/04; F16K 43/008

(Continued)

(56) References Cited

U.S. PATENT DOCUMENTS 267,416 A * 11/1882 Fulton ................... F16K 43/008 251/211
326,022 A * 9/1885 Witt ...................... F16K 43/008 251/211

(Continued)

FOREIGN PATENT DOCUMENTS

BR 132018074953 E2 10/2019
WO 2015/190926 A1 12/2015

(Continued)

*Primary Examiner* — Kenneth Rinehart
*Assistant Examiner* — Jonathan J Waddy
(74) *Attorney, Agent, or Firm* — The Dobrusin Law Firm, P.C.

(57) ABSTRACT

The present invention relates to a flow regulator for carbonated beverages, enabling flow uniformity throughout the operation and guaranteeing the sensorial quality of the beverage. Thus, a regulator for controlling the flow of carbonated beverages is taught, provided with a main body comprising at least two parts, a downstream part (1), having a hole for the exit of the carbonated beverage, and an upstream part (3), having a inlet hole for the carbonated beverage under pressure, or the main body comprising at least three parts, the downstream part (1), the upstream part (3) and a central part (5), having at least two attachable and detachable parts. The parts are equipped with frustum-shaped cavities that accommodate a double conical part (2); the double conical part (2) comprises an upstream cone portion (25), the diameter of which increases in the direction of the beverage flow, and a downstream cone portion (24), the diameter of which decreases in the direction of the beverage flow. The end (21) of the downstream cone portion (24) transfers the force from the beverage pressure exerted on the upstream cone portion (25), including the force exerted on the convex end (22), to an elastomeric material (6) which deforms depending on the pressure of the beverage; the elastomeric material (6) is also housed in a support (Continued)

coupled (14) to the downstream part (1) or in a movable support (4), and the movable support (4) can either be fixed to the downstream part (1), in the central part (5) or in the union between the aforementioned downstream part (1) and central part (5).

9 Claims, 17 Drawing Sheets

(58) Field of Classification Search
USPC ............... 137/329.02, 533.25; 251/211, 323; 267/153
See application file for complete search history.

(56) References Cited

U.S. PATENT DOCUMENTS 779,599 A * 1/1905 Hatch ................... F24D 19/081 236/62
1,030,714 A * 6/1912 Brooke ................... F04F 5/461 251/211
1,036,513 A * 8/1912 Nichol .................... F16K 17/00 137/466
2,111,858 A * 3/1938 Jensen ...................... F16N 7/30 251/211
2,637,337 A * 5/1953 Martin .................. F16K 15/026 137/498
2,659,197 A * 11/1953 Frank ........................ F02K 9/50 251/211
3,272,218 A * 9/1966 Johnson .................. F16K 31/36 137/625.25
4,328,820 A * 5/1982 Serur ...................... F16K 31/22 137/553
4,562,861 A * 1/1986 Payton .................... F16K 49/00 251/118
4,813,452 A * 3/1989 Smith ....................... F16K 1/12 137/542
5,699,859 A * 12/1997 Poirier .................. F16K 15/026 417/434
6,092,547 A * 7/2000 Komiya .................. F16K 31/22 137/433
9,610,551 B2 4/2017 Erigican et al.
10,704,815 B2 * 7/2020 Lundberg ................ F25B 45/00
2003/0196703 A1 * 10/2003 DeCler ................... F16K 15/18 137/538
2007/0193633 A1 * 8/2007 Howell ................. F16K 15/063 137/542
2010/0164154 A1 * 7/2010 Huang .................. F16F 3/0876 267/153
2019/0226598 A1 * 7/2019 Landacre ............ F16K 31/0658

FOREIGN PATENT DOCUMENTS

WO 2018/130887 A1 7/2018
WO 2018/162939 A1 9/2018
WO 2019/126850 A1 4/2019

* cited by examiner

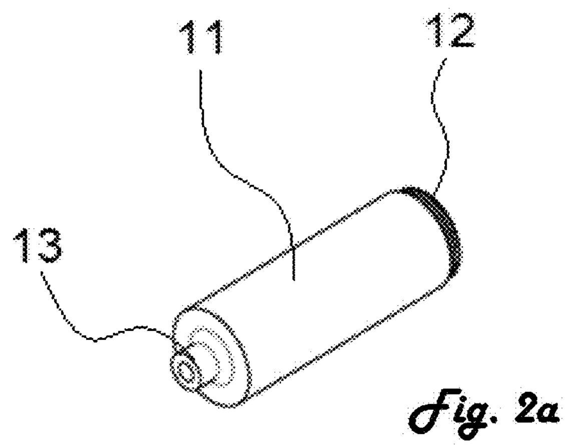
Fig. 2a
Fig. 2b
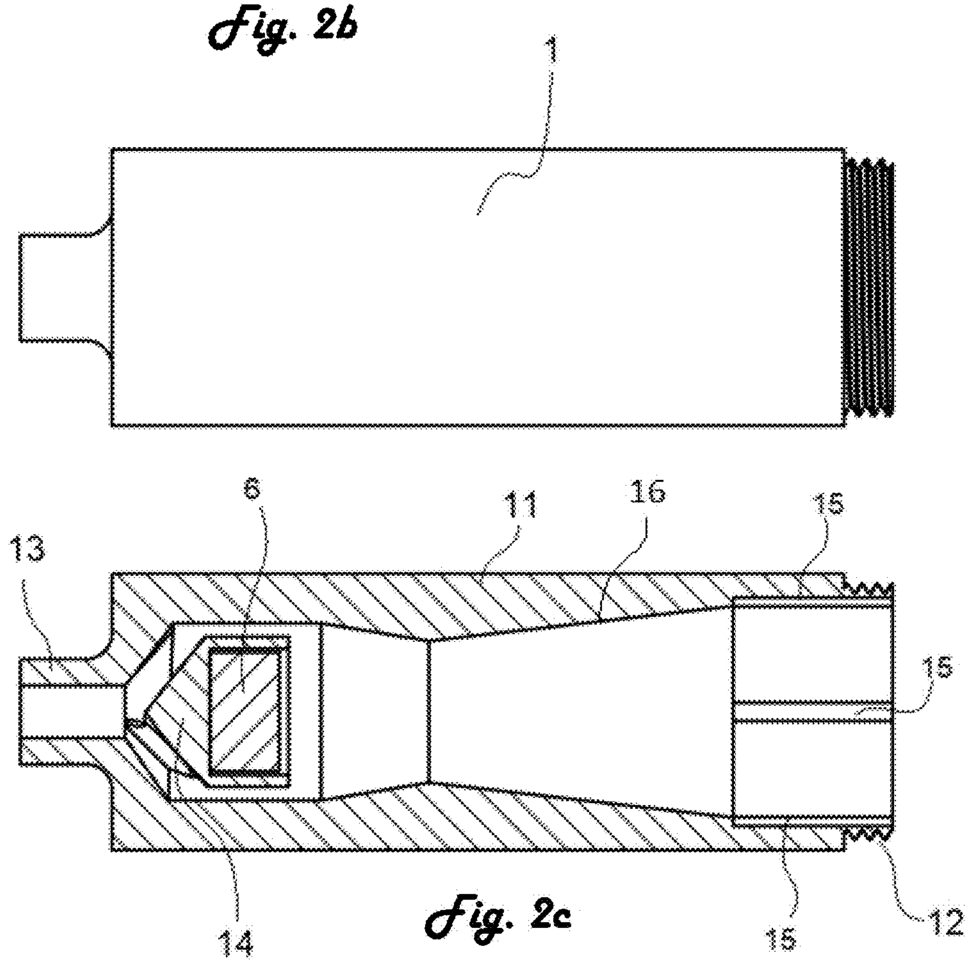
Fig. 2c

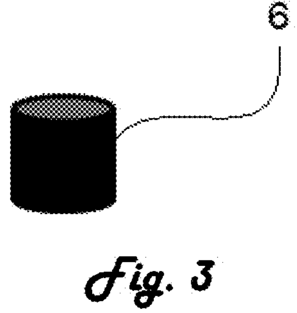
Fig. 3
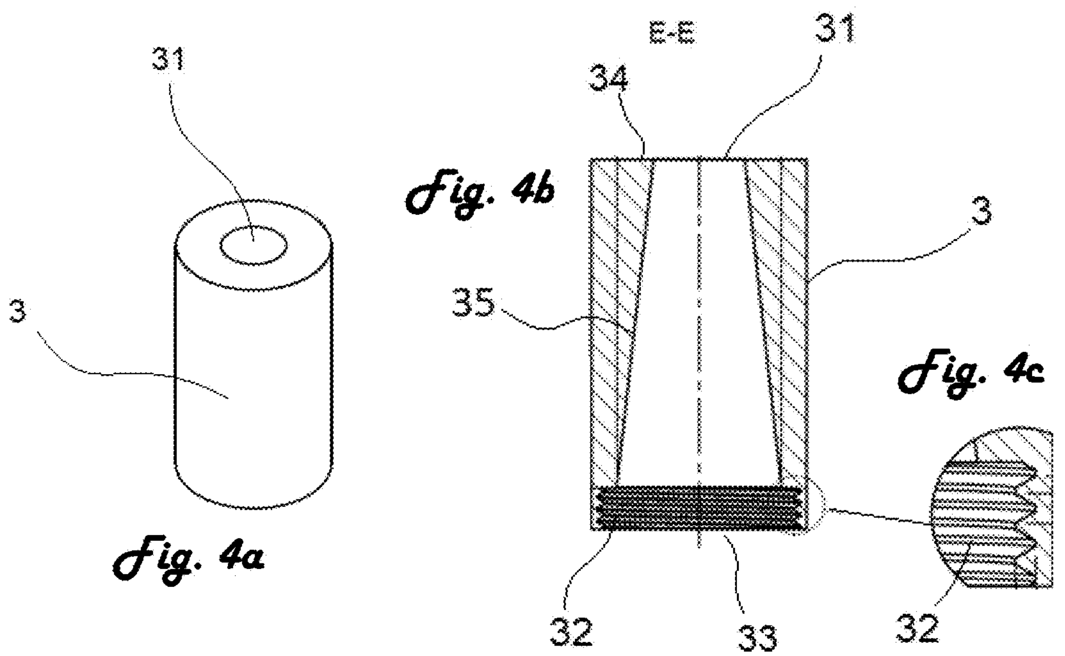
Fig. 4a
Fig. 4b
Fig. 4c

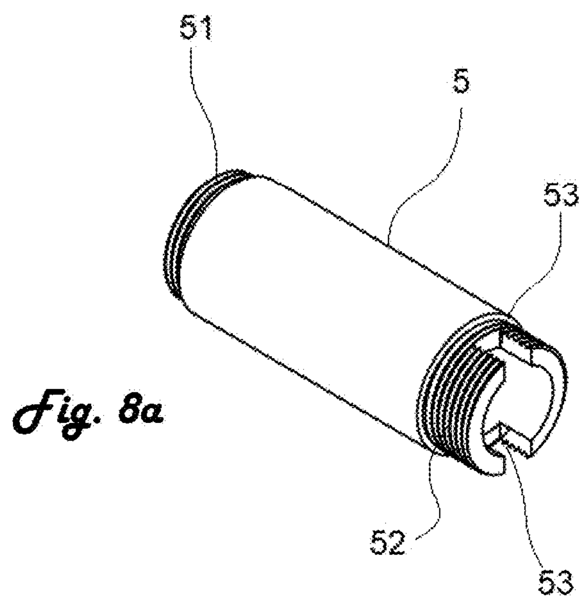
Fig. 8a
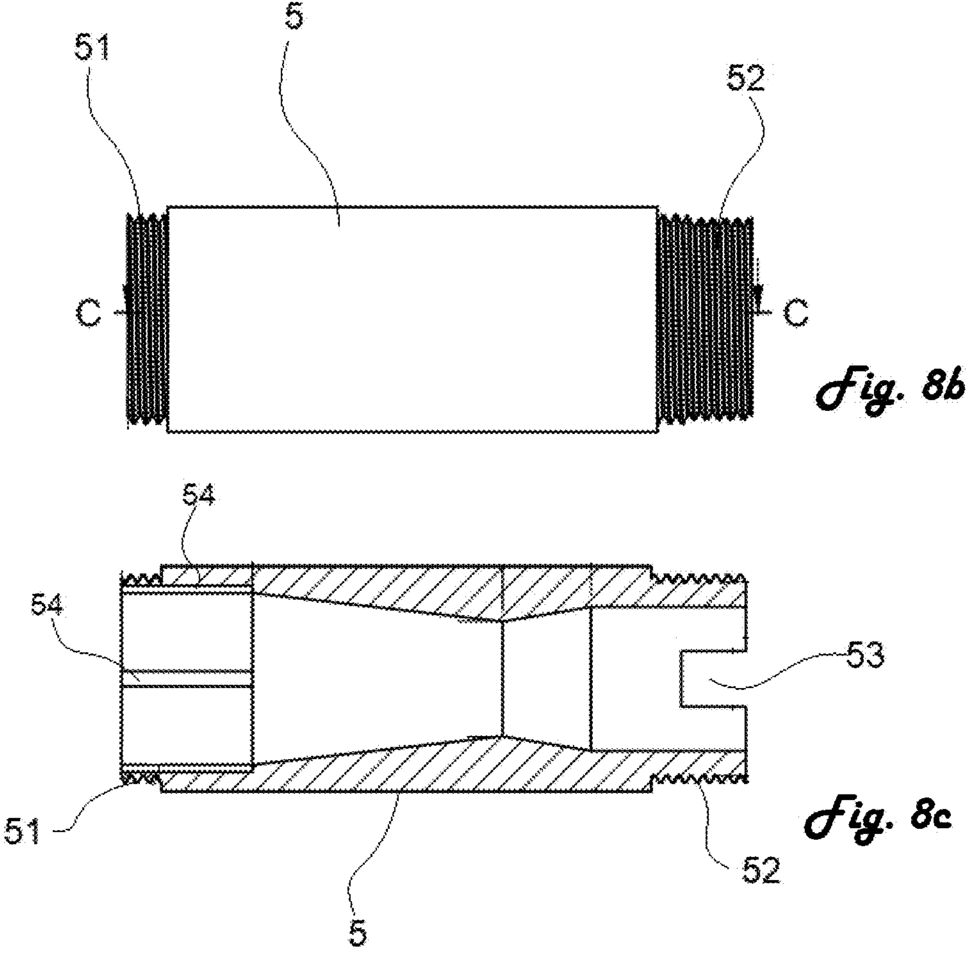
Fig. 8b
Fig. 8c

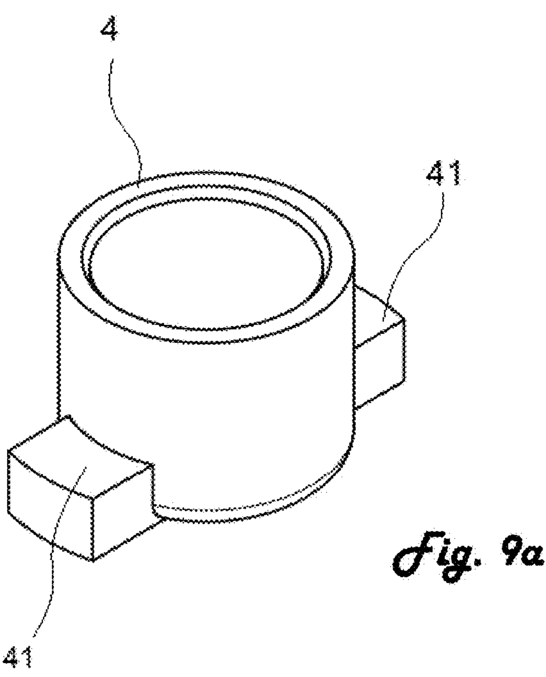
Fig. 9a
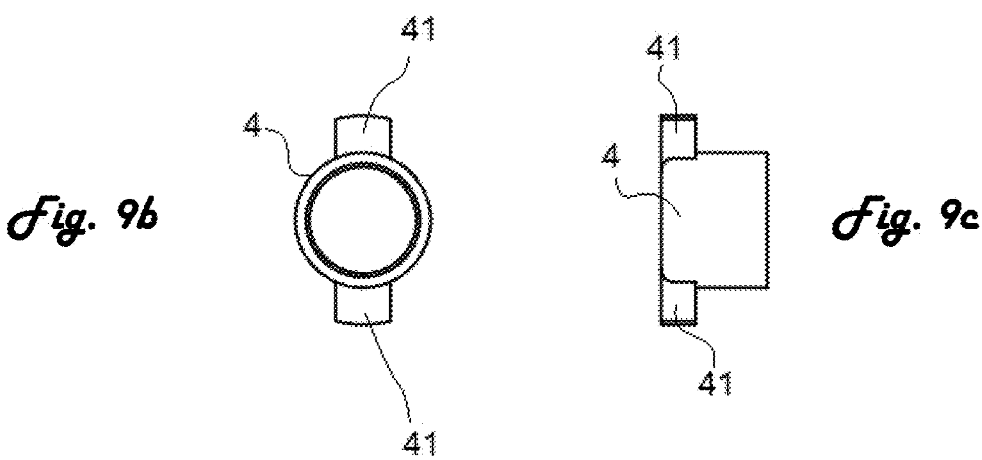
Fig. 9b
Fig. 9c
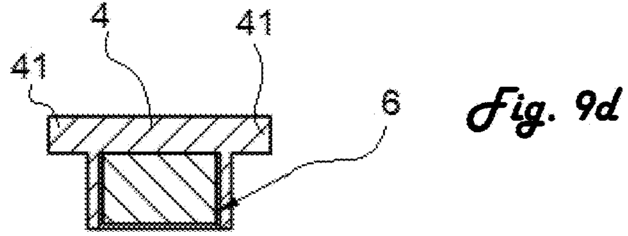
Fig. 9d

Fig. 11a
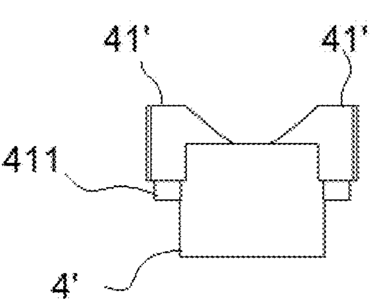
Fig. 11b
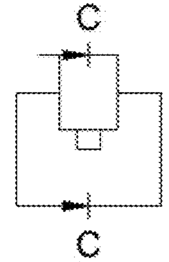
Fig. 11c
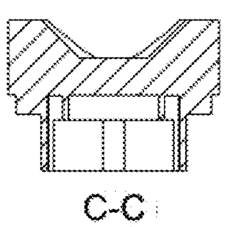
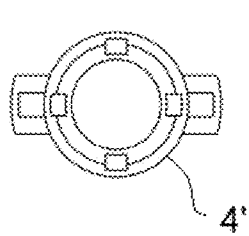
Fig. 11d
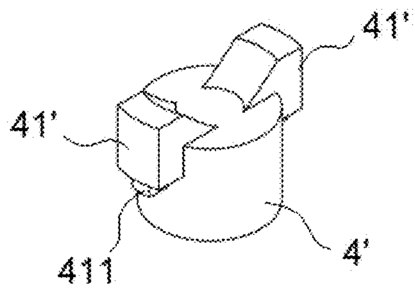
Fig. 11e
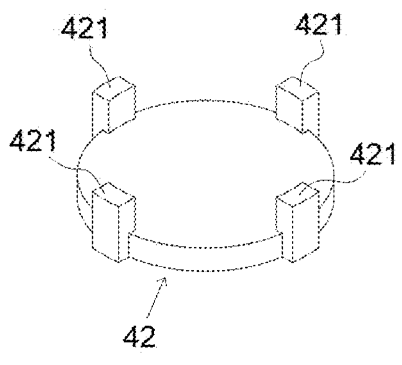
Fig. 11f

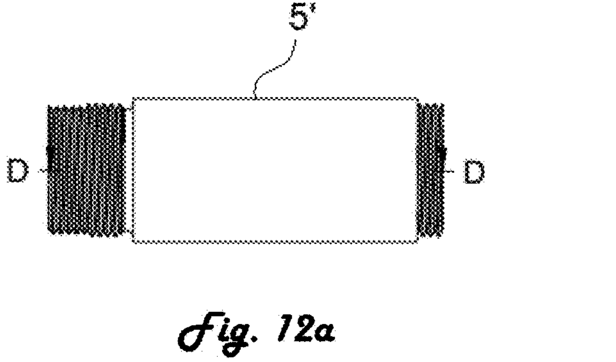
Fig. 12a
Fig. 12b
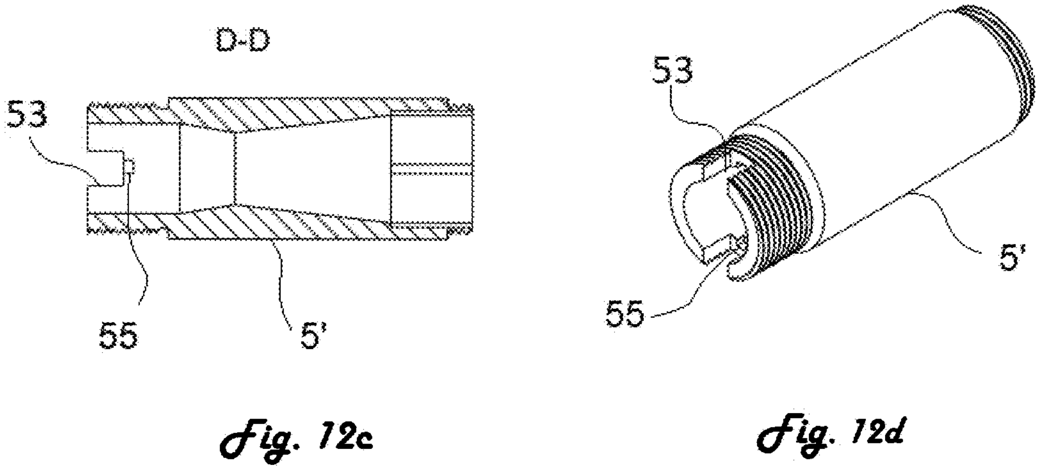
Fig. 12c
Fig. 12d

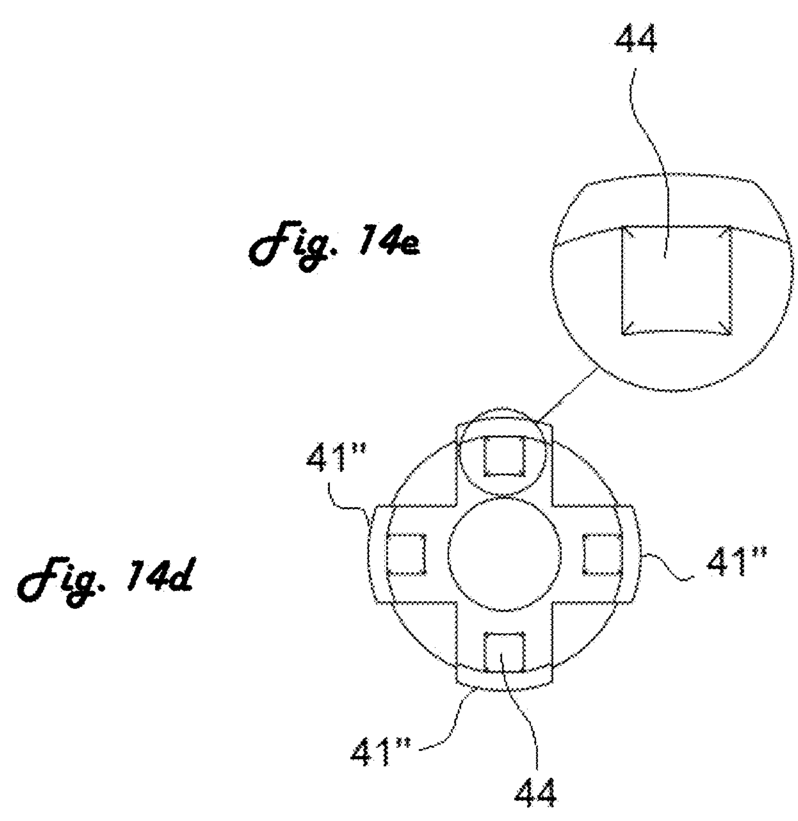
44
Fig. 14e
41"
41"
Fig. 14d
41"
44
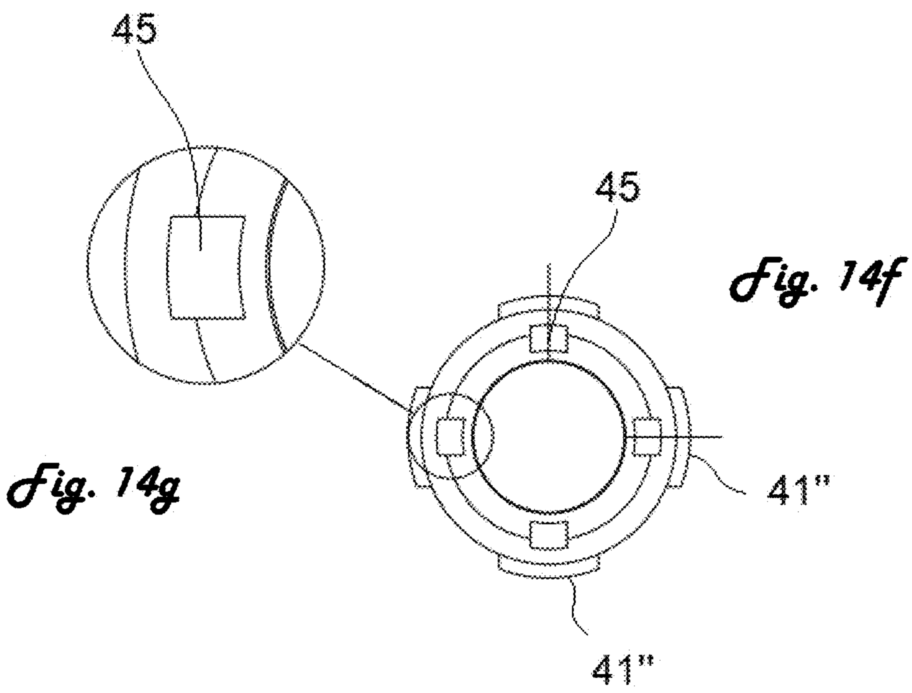
45
45
Fig. 14f
Fig. 14g
41"
41"

17
1"

17
18

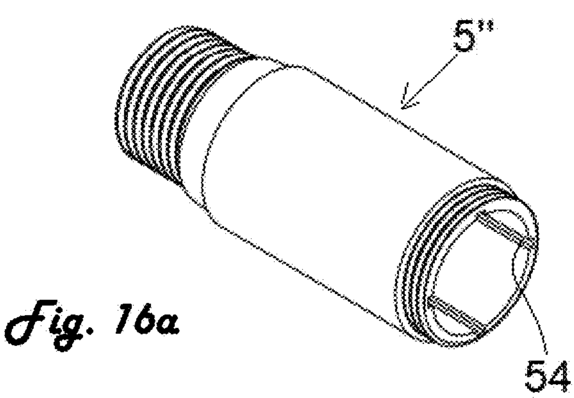
Fig. 16a
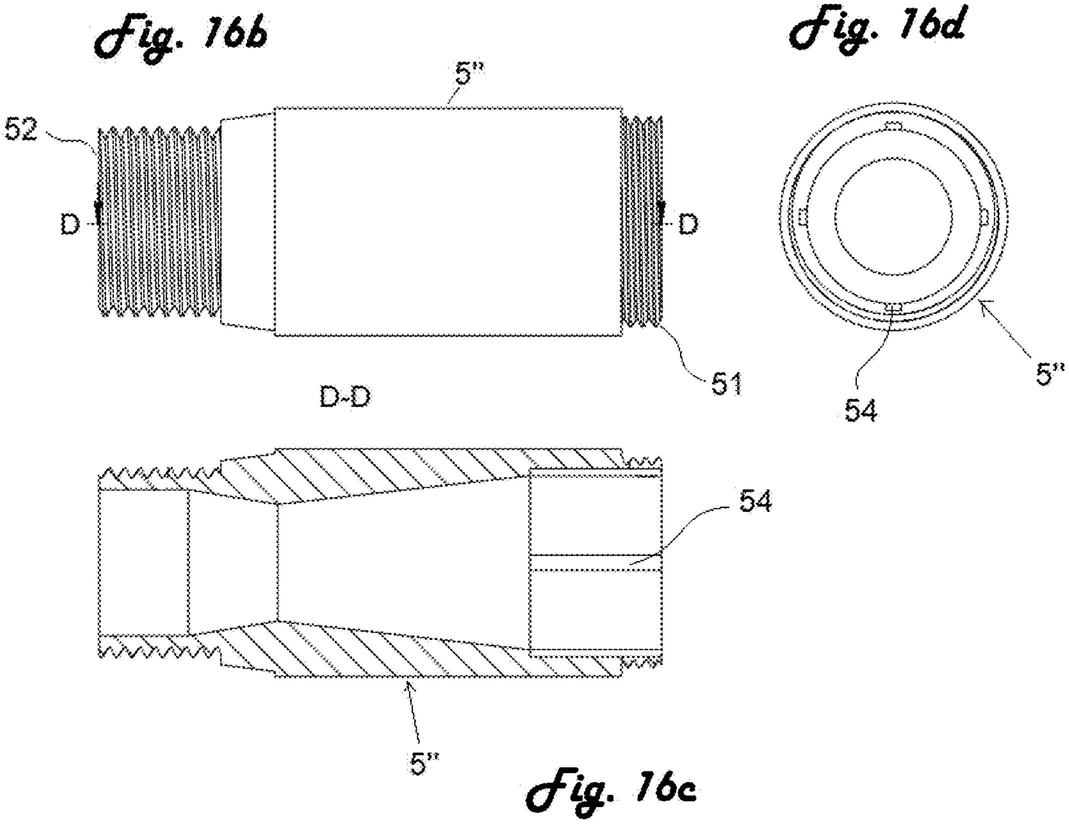
Fig. 16b
Fig. 16d
Fig. 16c

REGULATOR FOR CONTROLLING THE FLOW OF CARBONATED BEVERAGES

FIELD OF INVENTION

The present invention belongs to the field of flow regulators for dispensing carbonated beverages. In particular, said invention is coupled to a state of art dispensing valve, which is used in small, portable pressurized packaging, such as a PET (polyethylene terephthalate) bottle.

The present invention works as a regulating mechanism for the liquid output flow, enabling a uniform flow throughout the use of the beverage from the bottle (since when the container is at maximum pressure or at minimum pressure), ensuring the sensorial quality of the beverage throughout consumption.

BACKGROUND OF THE INVENTION

Currently, existing devices for storing and dispensing carbonated beverages, especially alcoholic beverages such as draft beer, in smaller containers, have gained great prominence, as they provide a new form of consumption, with portability as its major differentiation factor. These containers are commonly called "growlers", are generally made of glass, ceramic or plastic, and have the advantage of allowing the carbonated beverage to be transported to the location chosen by the user.

Thus, the user who consumes the draft beer is not restricted to the place of dispensing (or, as it is also known, the place where the beer is served), such as a bar, restaurant, or other type of commercial establishment, but the user can, for example, enjoying the beverage at a campsite or even on the high seas during a fishing trip.

However, although such containers make transportation possible, they still do not guarantee the perfect "way to serve" the beverage, as they do not prevent the loss of gasification (carbonation) over time. Thus, the sensorial quality of the beverage is quickly lost due to decarbonation, and the shape and consistency of the beer foam "served" by such containers, in most cases, is not the same as when the beverage is served by a professional bartender.

The relevance of the beer foam for the beer consumer is well known, and current "growlers" do not make it possible to serve and maintain a quality foam, serving only as mere reservoirs.

In a balanced system for serving beer, the beverage is served with dissolved gasification levels close to the levels at which it was produced; that is, its sensorial quality is not compromised by the "serving" operation.

In this sense, the containers or "growlers" available on the market have not solved this challenge, as they are still used only as containers, without any added functionality.

In order to fill this technological and marketing gap, a carbonated liquid dispensing valve, described in patent document WO 2019126850, is attached to a portable packaging, which allows the "creaminess" of the beverage to be customized. Next, a liquid output flow regulator was developed, described in document BR 132018074953-5, but still with limitations to be overcome, such as the use of a helical spring. Turbulence was also not satisfactory, among other production difficulties, which were overcome in the present invention.

Continuing the development, research continued into more efficient ways of regulating the output flow of the gasified liquid, and the present invention was achieved.

The patent literature reveals some prior art documents that will be described below.

Patent document WO 2018130887 discloses a valve device for filling and emptying pressurized PET containers, however it does not mention customizing the "creaminess" of the beverage and the flow control is done by a spring, with the main body of the valve having the appearance of a head that sits on the bottle neck. It also includes a sealing system in contact with a distribution hole in the main body, in addition to a helical spring that extends internally along the entire length of the main body. The internal pressure control device automatically opens the container to the outside when a limit value is reached. In other words, it is a system that differs from the present invention, which does not use a spring and is positioned inside the bottle, where the only thing that coincides is the purpose of emptying the pressurized PET bottle.

Patent document WO 2018162939 discloses an apparatus for maintaining pressure in the headspace of the bottle at a level sufficient to distribute the beverage in the container automatically. It is a pressure regulator adapted for connection to a carbonated beverage container that is operated automatically when the headspace pressure reaches a predetermined level, to introduce additional pressurized gas into the container and to maintain sufficient pressure to dispense the beverage. The present invention is a pressure-regulating valve adapted to automatically maintain the pressure in the space between the liquid and the nozzle of the container at a predetermined level to ensure distribution of the beverage. It includes a housing containing a plunger surrounded by a force-generating element. The force impels the piston into engagement with a movable member between first and second positions to open or close a valve connected to a capsule containing a pressurized gas that is responsive to opening the valve. This configuration allows pressurized gas to enter the headspace of the container when the pressure in the headspace drops below a predetermined level. Likewise, it is a system that differs from the present invention, as it does not use a spring and is positioned inside the bottle. Furthermore, it has the advantage of not depending on an external gas source connected for its operation. This reduces the complexity and cost of the device of the present invention.

Patent document WO 2015190926 discloses a pressure regulator and a pressurized gas reservoir comprising an outlet having a valve, wherein the pressure regulator is arranged to open the valve. The pressure regulator comprises a chamber having a portion of wall defined by a deformable member, with the chamber being substantially liquid-tight and comprising a gas. Likewise, it is a system that differs from the one presented in the present invention, as it does not use a spring and is positioned inside the bottle.

Patent document U.S. Pat. No. 9,610,551 has substantial differences compared to the present invention, such as the number and function of the protrusions on the conical part, and the way the liquid enters. In the present invention, it is the cylinder made of elastomeric material (rubber) that will absorb the impact of the beverage pressure, which is absent in said US patent. In the present invention the shape of the conical part itself, advantageously, is a double conical shape, where in the US patent it is just a simple part. In the US patent there is a carbonator in communication with the inlet and the flow compensator, which has the function of mixing carbon dioxide with water.

Patent document WO 2022051389 discloses a single nozzle for depressurization and distribution of varied water: cold/hot, with/without aromatization, and/or with/without carbonation. This prior art document is provided with an insert, which has a double conical shape. However, the disclosed insert has the unique function of lowering water pressure, minimizing the loss of carbonation when the water is carbonated. In the present invention, in a different and advantageous way, in addition to reducing the pressure and preserving the carbonation of the beverage, flow control is carried out by means of displacement of the double conical part in the longitudinal direction. The displacement of the double conical part occurs through the action of an elastomeric part, which expands and contracts to maintain a constant flow of beverage at the regulator outlet. This beverage flow control mechanism of the present invention is advantageously simple and low-cost, allowing the carbonation of the beverage to be preserved and transported in a pressurized container. In short, the elastomeric material controls the space between the double conical part and the internal conical walls of the downstream part, also regulating the flow of beverage in the present invention, a characteristic not disclosed in document WO 2022051389.

Although there are many flow/pressure control devices in the prior art for use with containers for dispensing carbonated beverages, such as draft beer or similar, they are generally quite complex and present low efficiency.

SUMMARY OF THE INVENTION

In view of the above, the present invention teaches a regulatory mechanism to be used in pressurized portable packaging that allows optimal control of the output flow of the carbonated beverage, preferably draft beer, wherever the consumer is, whether within home or, for example, on top of a mountain. Thus, portability is guaranteed with high quality and reproducibility of "creaminess" and carbonation of the beverage, so that its output flow is constant throughout the consumption of the beverage from the bottle, especially at the end of consumption, which is the most critical phase in terms of pressurization.

Thus, the present invention refers to a regulator for controlling the flow of carbonated beverages provided with a main body comprising at least two parts, a downstream part, having a hole for the exit of the carbonated beverage and an upstream part, having an inlet hole for the carbonated beverage under pressure.

In one embodiment, the present invention provides for a main body comprising at least three parts, the downstream part, the upstream part and a central part, having at least two attachable and detachable parts.

At least two said parts are provided with cavities in a substantial frustum-cone shape that accommodate a substantially double conical part. The double conical part is not a perfect cone because on one side the apex is bulged and on the other it is cut (actually forming a frustum-cone), but here it should be understood that the double conical part has substantially this shape.

The double conical part comprises an upstream cone portion, the diameter of which increases in the direction of the beverage flow, and a downstream cone portion, the diameter of which decreases in the direction of the beverage flow.

The cavity of the downstream part or the cavity of the central part, or both, has the shape of a frustum-cone having its internal walls with substantially the same inclination, in relation to a longitudinal axis, for the downstream cone portion, and the cavity of the frustum-shaped upstream part has its internal walls with substantially the same inclination, in relation to a longitudinal axis, for the upstream cone portion.

The end of the downstream conical portion transfers the force exerted by beverage pressure on the upstream conical portion, including the force exerted on the convex end, to an elastomeric material that deforms depending on beverage pressure.

The elastomeric material is also housed in a fixed or mobile support attached to the downstream part.

The present invention was designed for installation in a siphon or liquid intake tube of a valve, preferably at the lower end of a siphon or liquid outlet tube, connected to a liquid outlet valve in order to allow that the beverage output flow is constant throughout the bottle handling.

The present invention is even more preferred for use in beverage-dispensing valves provided with two dispensing modes, that is, a mode where the beverage is dispensed without the foam and a mode where the beverage is dispensed with the foam. In other words, those valves designed to "serving" the beer. As the regulator of the present invention provides a beverage with a laminar flow and without turbulence, draft beer can be served with precision.

The present invention is even more preferable for use in valves suitable for portable packaging, as due to the costs and dimensions of said valve, it is possible to use it attached to a small packaging.

In summary, the regulator of the present invention can be used in any type of pressurized container, both portable and fixed.

Said regulator is useful in dispensing any carbonated liquid such as, for example, sparkling wine, sparkling water, carbonated juice, soft drinks, draft beer, beer, among other liquids of interest, as well as mixtures thereof.

The present invention comprises a cylindrical body divided into at least two detachable and screwable parts (downstream and upstream). In another embodiment of the invention, there is provision for another central part comprised between the downstream and upstream parts.

In one embodiment of the invention, an o-ring and a central portion having two rectangular slots on its edge are provided, where the support arms of elastomeric material are accommodated.

In one embodiment, there is advantageously no need for the o-ring, or for rectangular slots in the central part to accommodate the support arms of elastomeric material. To eliminate the o-ring and facilitate the manufacture of the invention, in this embodiment the support arms of elastomeric material have a very peculiar shape.

In all embodiments of the invention, there is always a double conical part having fins that fit into small guides (fins) in the downstream part or the central part of the regulator. The fins are preferably arranged on the straight portion of the double conical part.

In a first embodiment, the downstream part is constructed with the support of elastomeric material incorporated. This elastomeric material is preferably a small cylinder that will absorb the impact of the pressure of the liquid flowing from the bottle, giving the fluid flow direction. In other words, the elastomeric material will deform in the longitudinal axial direction to increase or decrease the liquid passage volume formed by the internal conical wall of the downstream part and the double conical part (of the downstream portion).

In all embodiments, the upstream part of the regulator (liquid entry area) has a hollow interior having a conical internal section, with an open base containing a thread in the internal part and the lower base partially closed with a concentric hole.

The downstream part of the regulator (liquid outlet area) is equipped with a spare external part having a small hollow concentric cylinder where the siphon (or liquid intake tube) is coupled.

The liquid output flow will be adjusted depending on the greater or lesser distance between the inner wall of the downstream part or central part and the downstream part of the double conical part.

When the container is completely filled and pressurized, the beverage entering the regulator will exert maximum pressure on the double conical part and, as a consequence, the elastomeric material will deform to its maximum limit. Therefore, the internal wall of the downstream part of the regulator and the double conical part will be very close due to the conical internal geometry of the downstream part, resulting in little space for liquid flow.

As the liquid is consumed, the pressure of the double conical part on the elastomeric material becomes smaller. Then the elastomeric material pushes the double conical part, causing it to move inside the regulator and, consequently, creating greater spacing between it and the internal wall of the downstream part of the regulator, freeing up more space for the liquid to flow. This mechanism provides flow regulation and preservation of carbonation, something not achieved by other prior art solutions.

The regulator allows control of the liquid output flow, allowing even liquids subjected to high pressure to have a constant flow throughout the operation.

This allows the gas to be stored in the same container as the liquid, eliminating the use of auxiliary cylinders (internal or external) found in this type of portable beverage containers from the prior art. That is, the use of the liquid storage device itself as a gas storage device guarantees some advantages of the present invention, such as: low production cost, flow uniformity, and preservation of liquid gasification.

In other words, the regulator guarantees flow uniformity while preventing decarbonation of the beverage, preserving its integrity.

The present invention also has the advantage of being able to reuse the apparatus. At the same time, as its production cost is very low, the present invention can even be disposable.

There are also advantages in using an elastomeric material instead of a conventional spring.

The elastomeric material is non-toxic and does not rust like a conventional metal spring. Furthermore, the cost of a normal spring (made of metal or even polymer) would be much higher for the present invention, which aims at a very low-cost product, preserving the same qualities as the prior art solutions.

The invention presented here also solves previously existing technological challenges, as it allows consumption to occur under the condition of a newly carbonated beverage, and allows portability in consumption, maintaining the amount of gas in the beverage and, as a consequence, maintaining sensorial quality more efficiently than existing devices in the prior art.

BRIEF DESCRIPTION OF THE FIGURES

To complement the description of the invention in order to obtain a better understanding of the object, the figures mentioned throughout this technical report will be described below.

FIG. 2*a* illustrates the downstream part (1) of the regulator of the first embodiment, which is a downstream cylindrical body (11) having a thread (12) in the lower portion and a spare cylinder (13), where a siphon or tube (not shown) is coupled. FIG. 2*c* illustrates a longitudinal section of the downstream part (1) shown in FIG. 2*b*. FIG. 2*c* also shows a coupled support (14) for an elastomeric material (6), wherein the conical geometry of the internal part follows the geometry of the double conical part (2).

FIG. 3 shows the elastomeric material (6) used in the embodiments of the invention, which has a preferably cylindrical shape.

FIG. 4*a* shows the upstream part (3) of the regulator set facing upwards, showing the center hole (31) through which the liquid is admitted. FIG. 4*b* illustrates the longitudinal section of the upstream part (3), with the fitting thread (32) and the conical geometry of the internal part, which will follow the geometry of the double conical part (2). FIG. 4*c* shows a detail of the thread (32).

FIGS. 4*a*, 4*b* and 4*c* contemplate all embodiments of the invention, with only the dimensions being modified, which are smaller in the third and fourth embodiments.

FIGS. 5*a*, 5*b* and 5*c* refer to all embodiments of the invention.

FIG. 8*a* illustrates the second embodiment of the invention, showing a perspective view of the central part (5) of the regulator. FIG. 8*b* shows a side view, and FIG. 8*c* shows the longitudinal section having the internal detailing of the central part (5).

FIG. 9*a* illustrates the second embodiment of the invention, showing a perspective view of the support (4) for fitting the elastomeric material (6), FIG. 9*b* shows a top view, FIG. 9*c* shows a side view, and FIG. 9*d* shows the longitudinal section.

FIG. 11*a* shows a front view of the support (4') of the third embodiment, FIG. 11*b* shows a side view, and FIG. 11*c* shows the section C-C indicated in FIG. 11*b*. FIGS. 11*d* and 11*e* show a bottom and a perspective view of the support (4'), respectively. FIG. 11*f* shows the cover (42) of elastomeric material (6).

FIG. 12*a* illustrates a side view of the central part (5') of the third embodiment of the invention, and FIG. 12*c* shows the longitudinal section D-D indicated in FIG. 12*a*. FIG. 12*b* shows a top view, and FIG. 12*d* shows a perspective view of the central part (5') of the third embodiment of the invention.

FIG. 14*d* shows a top view, and FIG. 14*e* shows a detail of the guide pin (44). FIG. 14*f* shows a bottom view, and FIG. 14*g* shows a detail of the recess (45) to accommodate the pin (421) of the cover (42).

FIG. 16*a* shows the central part (5") of the fourth embodiment of the invention. FIG. 16*b* shows a side view, and FIG. 16*c* shows the longitudinal section D-D of FIG. 16*b*. FIG. 16*d* shows a right side view of FIG. 16*b*.

DETAILED DESCRIPTION OF THE INVENTION

Figure 1:
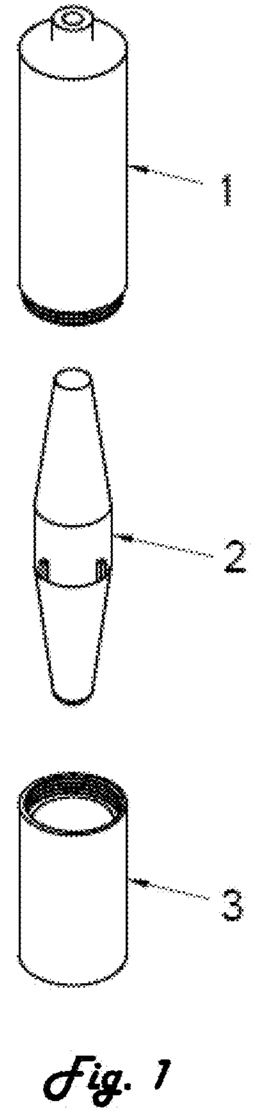
FIG. 1 shows an exploded view of a first embodiment of the invention, with a downstream part (1), a double conical part (2), and an upstream part (3).
Figure 5A:
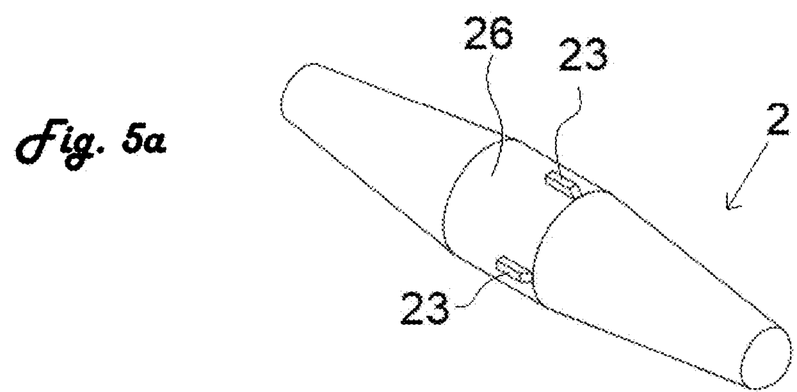
FIG. 5*a* illustrates a perspective view of the double conical part (2) having its fins (23) arranged on a straight portion (26).
Figure 5B:
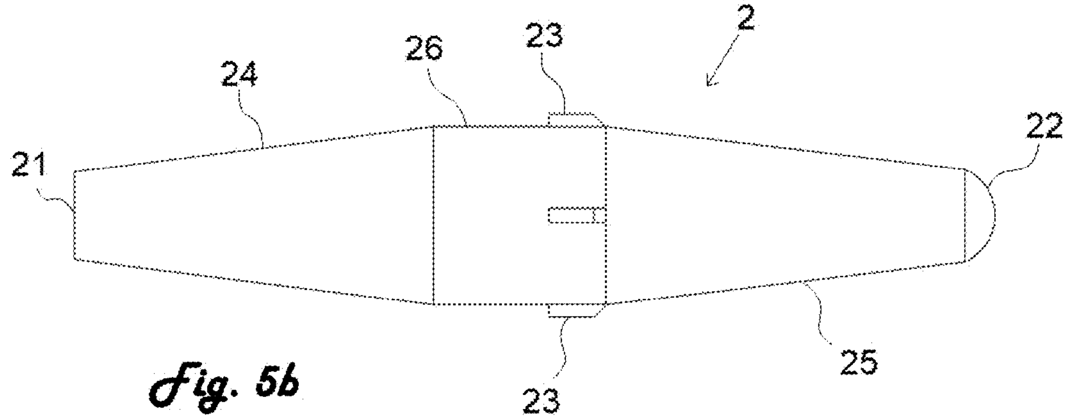
FIG. 5*b* shows a side view where the end (21) is straight, which contacts the elastomeric material (6), and the other end (22) is convex, which receives the flow with pressure from inside the container.
Figure 5C:
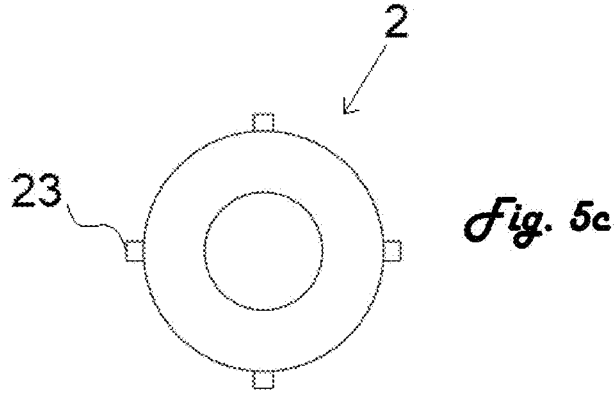
FIG. 5*c* shows a cross-section of the double conical part (2) with the fins (23).
Figure 6:
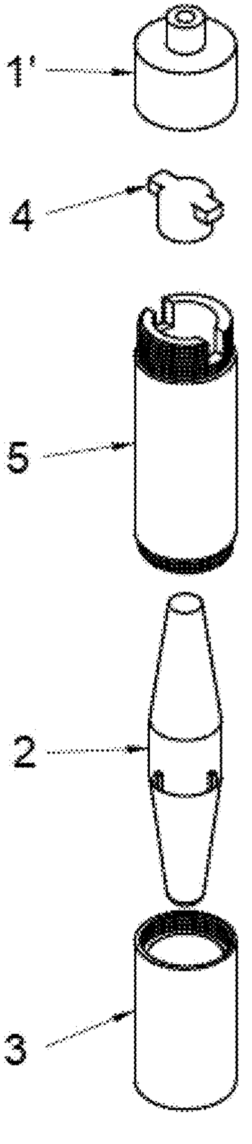
FIG. 6 shows an exploded view of a second embodiment of the invention, with a downstream part (1'), a support (4) of elastomeric material, a central part (5), a double conical part (2), and an upstream part (3) of the regulator.
Figure 7A:
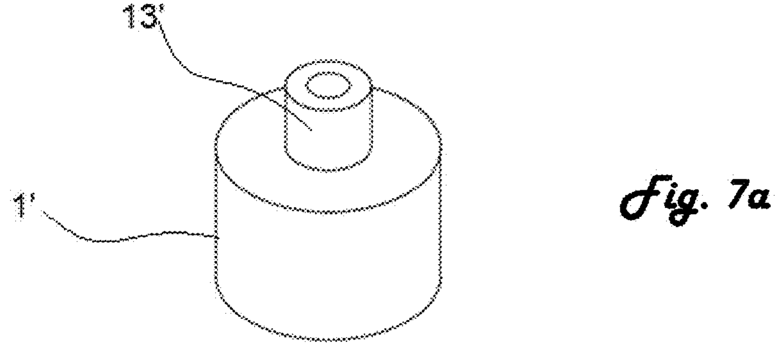
FIG. 7*a* illustrates the second embodiment of the invention, showing the downstream part (1') of the regulator, and FIG. 7*b* showing the longitudinal section having the internal detailing of the part, including the fitting thread (12').
Figure 7B:
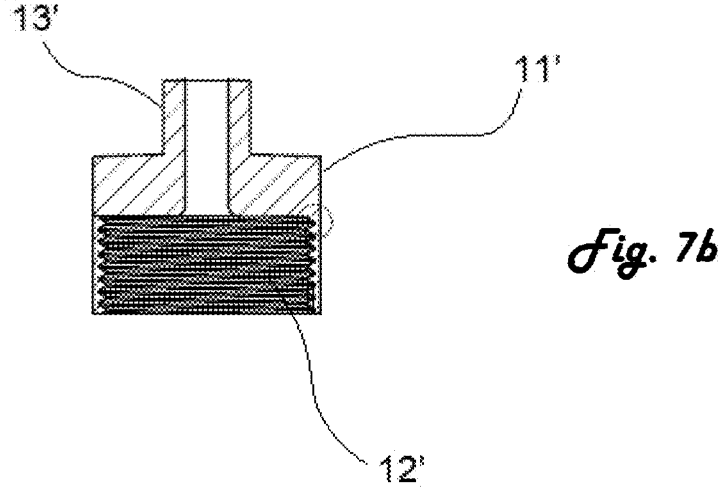

The present invention can be implemented based on the elements shown below, and the embodiments presented here constitute only examples of the invention without, however, excluding other possible embodiments that may not have been described here, but which are within the scope of the present invention.

The parts of said regulator described here constitute a substantially cylindrical body. Said parts can be manufactured from different materials such as polymers, preferably polypropylene plastic, among other possible plastics as well as a combination thereof.

The operating mechanism of the regulator of the present invention causes the carbonated beverage to flow through the spaces between the internal walls of the parts of the regulator and the double conical part (2), as well as of the mobile support (4).

The double conical part (2) will press with greater or lesser intensity, depending on the volume/pressure of liquid inside a container, the elastomeric material (6).

The elastomeric material (6) is disposed on a coupled support (14), which in the first embodiment is fixed inside the downstream part (1), or, in other embodiments of the invention, within the support for the movable cylinder (4).

This elastomeric material (6) is preferably cylindrical and necessarily flexible to absorb the impact of pressure of liquid when it enters the regulator. Therefore, it will not allow the formation of too much foam in the beverage, thus enabling a laminar and constant flow, until the liquid in the bottle runs out, that is, even at low pressures, which is an advantage of the invention.

The elastomeric material (6) has a reference elastic constant ($k_{ref}$) between 70 and 190 N/mm, preferably 130 N/mm.

The elastomeric material (6) may preferably be silicone rubber, or extra flexible silicone rubber, or 70 Shore A silicone rubber, or latex.

The diameter of the cylinder of elastomeric material (6) preferably varies from 3 to 12 mm, within an even more preferred range of 4 to 9 mm.

The height of the cylinder of elastomeric material (6) preferably varies from 1 to 8 mm, within an even more preferred range of 2 to 6 mm.

The present invention then has four exemplary embodiments. In all embodiments, the liquid output flow will be adjusted according to the greater or lesser distance between the walls of the regulator parts and the double conical part (2). In all embodiments, the double conical part (2) and the upstream part (3) have identical arrangements, with only their dimensions changing in the third and fourth embodiments.

When the container is full and pressurized with a maximum pressure of approximately 6 kgf/cm$^2$, the liquid enters the regulator and exerts maximum pressure on the double conical part (2) against the elastomeric material (6).

Therefore, the internal conical wall (16) of the downstream part and the upstream cone portion (24) of the double conical part (2) will be very close, due to the conical internal geometry of the internal wall of the regulator, resulting in little space for the liquid to flow.

In summary, the liquid enters through the upstream part (3) and the pressure of the liquid pushes the double conical part (2) by means of the upstream cone portion (25), including the convex end (22), against the internal conical wall (16) of the downstream part (1), thus regulating the passage of the gasified liquid. The liquid exits in the downstream part (1) to the siphon or liquid intake tube of a valve (not shown).

The double conical shape of the double conical part (2) is important for the gradual compensation of the pressure variation in the container, since the space for the liquid to flow through the downstream part (1) and the double conical part (2) is progressively reduced. Furthermore, this arrangement eliminates the decabonation of the beverage.

The vast majority of state-of-the-art containers work with constant pressures, therefore they require a greater number of components, increasing the cost of the solution.

After the point of maximum reduction (highest pressure) the space also increases progressively, increasing the volume between the downstream part (1) and the double conical part (2). This avoids chokes or sudden releases of the flow, allowing gradual compensation of pressure in the mechanism. This gradualism is essential to avoid the disincorporation of gas from the liquid.

In other words, by making a gradual and controlled reduction in pressure, the regulator of the present invention avoids the sudden variation in pressure that causes the disincorporation of gas from the beverage (decarbonation of the liquid).

The elastomeric material (6) has the function of dampening and opposing the pressure exerted by the beverage. This elastomeric material (6) can preferably be manufactured from silicone rubber, or extra flexible silicone rubber, or 70 Shore A silicone rubber, or latex.

The double conical part (2) rests on the elastomeric material (6) through its straight portion (21). The other end of the double conical part is convex (22), advantageously better distributing the pressure exerted by the beverage at the regulator inlet.

In the first embodiment of the invention, the regulator is composed of a cylindrical body divided into two detachable and screwable parts, the downstream part (1) and the upstream part (3). The downstream part (1) of the cylindrical body has a hollow internal part in a conical section.

In the downstream part (1) there is also a small spare cylinder (13) concentric where the siphon (not shown) will be fitted, through which the liquid exits. The siphon is still connected with an opening valve at the bottle nozzle (not shown).

In the first embodiment of the invention, in the downstream part (1), there is also a support (14) attached, where the elastomeric material (6) that will be used to absorb the impact of the pressure related to the flow of the liquid is accommodated, enabling a flow control independent of container pressure.

At the lower end of the downstream part there is a thread (12) that will allow coupling with the upstream part (3), in the first embodiment.

In the downstream part (1) there are guides (15) for the fins (23) of the double conical part. Preferably there are four guides (15) for the respective equidistant fins (23) (arranged at 90°) on the double conical part (2). The number and arrangement of fins (23) may vary without compromising the spirit of the invention. The fins (23) are preferably arranged on a straight portion (26). The fins have the function of guiding the double conical part, preventing it from tilting during operation, which would harm the performance of the present invention.

In the first embodiment of the invention, preferably the cylindrical body (that is, downstream and upstream parts together) has dimensions of approximately 11 cm in height and 2.1 cm in external diameter, with the downstream part (1) of the cylindrical body having a height of 4 to 8 cm, preferably 6.67 cm; external diameter of 1 to 3 cm, preferably 2.1 cm, having the internal part hollowed out in a conical section, and the internal diameter varying from 13 mm to 16 mm.

The spare cylinder (13) has a preferred external diameter of 8 mm, internal diameter of 4 mm and height of 8 mm. The cylinder made of elastomeric material (6) has a preferred height of 4 mm and a diameter of 7 mm. The thread (12) has a preferred size of 4 mm. The fittings for the fins (23) have a preferred height of 10 mm and a width of 2 mm.

The upstream part (3) has its interior hollowed out in a conical section, so that it follows the geometry of the double conical part (2), with its upper base being open (33), and in its internal lining there is a thread (32) which will connect with the downstream part (1) of the cylindrical body. The lower portion of the upstream part (3) is semi-open (34), with only one concentric hole (31) for liquid entry into the reducer.

In the second embodiment, the upstream part (3) has a height of approximately 1 to 6 cm, preferably 3.6 cm; external diameter of 1 to 5 cm, preferably 2.1 cm; the upstream part (3) has a hollow interior in a conical section, so that its internal wall (35) follows the geometry of the double conical part (2), with the internal diameter of the upstream part (3) varying from 9 mm to 21 mm; the upper base (33) is open and provided with a thread (32) 2 to 6 mm high, preferably 4 mm high, which connects with the downstream part (1); the lower semi-open base (34) is provided with a concentric hole (31) having a diameter of 4 to 15 mm, preferably 9 mm.

Inside the set formed by the two parts, downstream part (1) and upstream part (3), there is a double conical part (2) that fills the inside of the retainer touching the elastomeric material (6).

In this embodiment, the double conical part (2) preferably has a length of approximately 5 to 15 cm, preferably 7 to 10 cm, and most preferably 7.4 cm; maximum diameter of 4 cm, preferably diameter of 1.5 to 2 cm, having four equidistant fins (23) of 5 to 15 mm in height and 1 to 3 mm in width, preferably 10 mm in height and 2 mm in width, located on the center of the part, with the lower base of the part being straight (21) and having a diameter of 4 to 10 mm, preferably 7 to 8 mm, and the upper base having a convex shape (22) at an angle of 20° to 40°, preferably 30°.

The second embodiment of the invention has the same operating principle, however differs in that it is composed of three parts, a downstream part (1'), an upstream part (3) and central part (5).

These three parts are detachable and screwable, as in the previous embodiment.

The downstream part (1') has at its upper base a small spare concentric cylinder (13') and hollow, where the siphon is fitted, which will connect with the opening valve at the container nozzle. On the inner portion of the downstream part (1') there is a thread (12') that will allow it to fit with the central part (5).

The downstream part (1'), the central part (5) and the upstream part (3) have hollow internal sections in a conical shape. Said regulator also comprises, within the set formed by the downstream part (1'), central part (5) and upstream part (3), a double conical part (2). The upper part of the central part (5) is provided with a thread (52) where there are two cuts (53) that accommodate the arms (41) of a support (4) of elastomeric material (6). In other words, inside said support (4) the elastomeric material (6) is accommodated.

The regulator also comprises an upstream part (3) provided with an open base (33) that connects to the central part (5), and the other base is semi-open (34) having a hole (31) for liquid entry in the reducer.

The double conical part (2) is equipped with fins (23) that fit into the guides (54) of the central part (5) of the regulator.

The downstream part (1') has a height of 1 to 4 cm, preferably 2.2 cm; external diameter of 1 to 4 cm, preferably 2.1 cm; and on the upper base there is a spare concentric cylinder (13') having a height of 4 to 14 mm, preferably 8 mm; external diameter of 4 to 12 mm, preferably 8 mm; and internal diameter of 2 to 6 mm, preferably 4 mm; in the internal part subsequent to the spare cylinder (13') there is a thread (12') of 5 to 14 mm in height, preferably 9 mm in height.

The central part (5) has a hollow interior in a conical section, so that it follows the geometry of the double conical part (2); the upper base is open and on its outer covering there is a thread (52) that connects with the downstream part (1') of the cylindrical body; the thread (52) is also provided with two opposing cuts (53), wherein arms (41) of the support (4) are fitted, where the elastomeric cylinder (6) is housed; the lower base of the central part (5) is opened with a thread (51) for fixing to the upstream part (3) of the regulator.

The central part (5) has a height of 2 to 8 cm, preferably 5.8 cm; external diameter of 1 to 4 cm, preferably 2.1 cm; the central part (5) also has a hollow interior in a conical section having an internal diameter varying from 16 mm to 11 mm; the upper base is provided with a thread (52) 5 to 14 mm in height, preferably 9 mm; the thread (52) is also provided with two opposing cuts (53) having a width of 2 to 8 mm, preferably 5 mm each; the thread (51) has a height of 2 to 6 mm, preferably 4 mm.

In the two cuts (53) in the upper portion of the central part (5) a small support (4) will be fitted, inside which the elastomeric material (6) will be located.

The support (4) is preferably cylindrical in shape having a diameter of 0.3 to 2 cm, preferably 1.7 cm and a height of 1 to 15 cm, preferably 2 cm, with the arms (41) having a length of 0.5 to 2 cm, preferably 1.2 cm and width 1 to 5 mm, preferably 3 mm.

The upstream part (3) of the embodiments has substantially similar arrangements, with the dimensions changing in relation to the previous embodiment.

The approximate final dimensions of the set are preferably 11 cm in height and 2.1 cm in external diameter. The upper part (1') of the cylindrical body has a height of 2.2 cm, an external diameter of 2.1 cm, a spare cylinder (13') having an external diameter of 8 mm, an internal diameter of 4 mm and a height of 8 mm. The thread (12') is preferably 9 mm high, which will allow it to fit with the central part (5).

Inside the set of three parts, downstream part (1'), central part (5) and upstream part (3), there is a double conical part (2) that fills the entire length of the cylindrical body until it meets and touches the elastomeric material (6).

The double conical part (2) has the arrangement shown in the first embodiment, with small variations in dimensions in the other embodiments.

The third embodiment is similar to the second embodiment. However, in the third embodiment, the support (4') of elastomeric material (6) is different and the central part (5') has, in addition to the cuts (53), two recesses (55) to accommodate the lower projection (411) of the arms (41').

Figure 10:
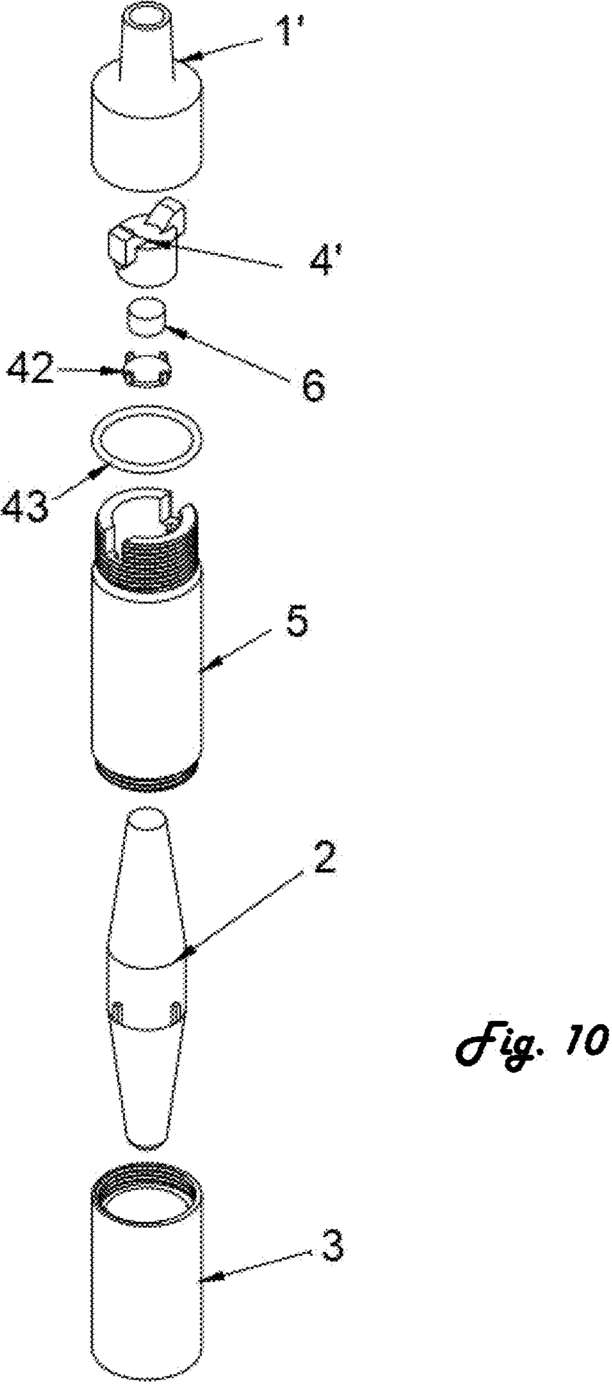
FIG. 10 shows an exploded view of a third embodiment of the invention, with a sealing o-ring (43) and a support (4') of elastomeric material having a specific shape.
Figure 13:
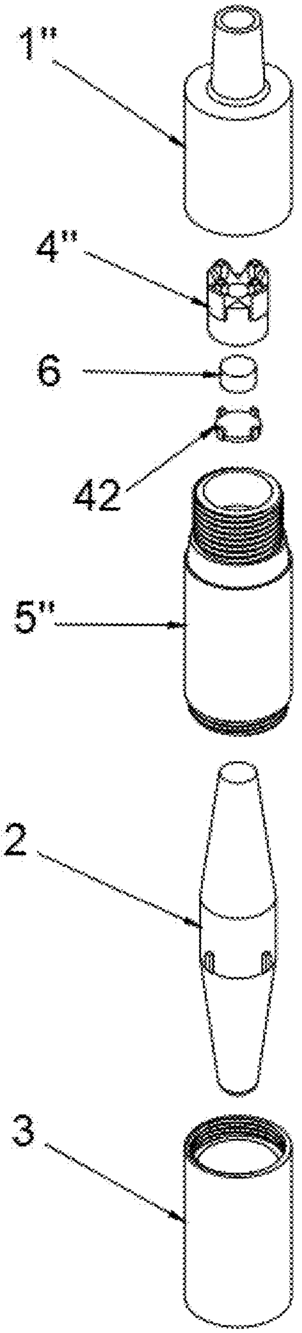
FIG. 13 shows an exploded view of a fourth embodiment of the invention.

In this embodiment, an o-ring (43) is also provided to prevent leaks, as shown in FIG. 10. Furthermore, the support arms (4') are spare as shown in FIGS. 11*a* to 11*e*. This embodiment also has a cover (42) for the elastomeric material (6).

FIGS. 12*a* to 12*d* show the central part (5').

The double conical part (2) of the third embodiment has different dimensions and is smaller than in previous embodiments, which allows it to be used in smaller containers.

The total length of the double conical part (2) in this embodiment is approximately 74 mm and its diameter is approximately 15 mm without considering the fins (23). The straight portion (26) has a length of approximately 14 mm. The diameter of the straight end (21) is approximately 7 mm. The downstream cone portion (24) is approximately 30 mm long. The fins are approximately 5 mm long and 1 mm high.

In this embodiment, the central part (5') has a diameter in the narrowest portion of the inner wall of approximately 11 mm, and the diameter in the widest portion of the inner wall is approximately 16 mm. The distance between the narrowest and widest portion is approximately 23 mm.

The other parts are sized to be compatible with the double conical part (2) and the central part (5'), certainly leaving space for the beverage to pass through.

Figure 14A:
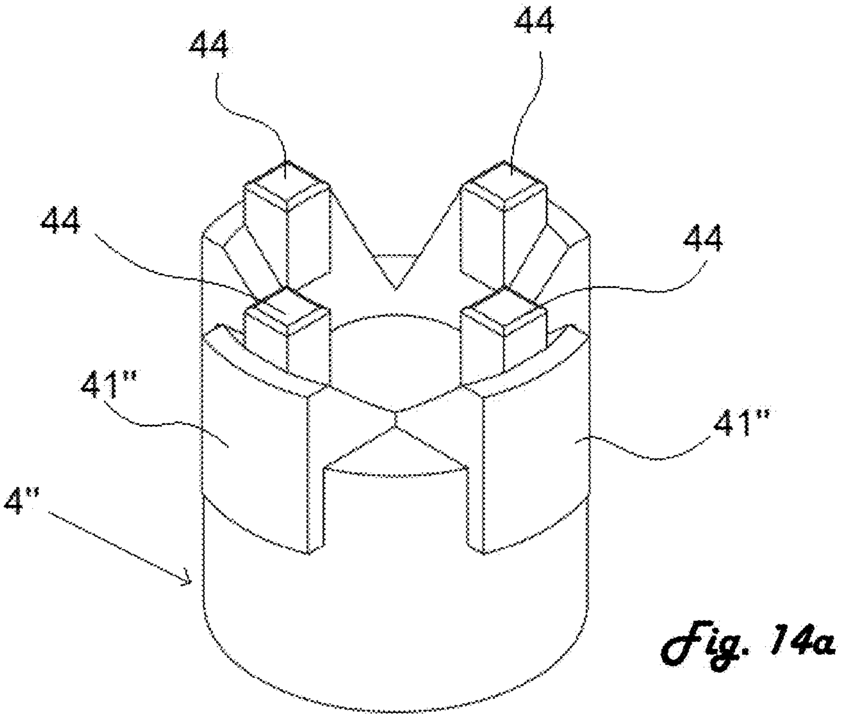
FIG. 14*a* shows a perspective view of the support (4") of the fourth embodiment of the invention.
Figure 14B:
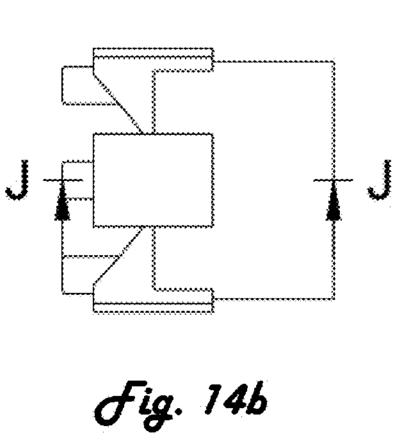
FIG. 14*b* illustrates a side view.
Figure 14C:
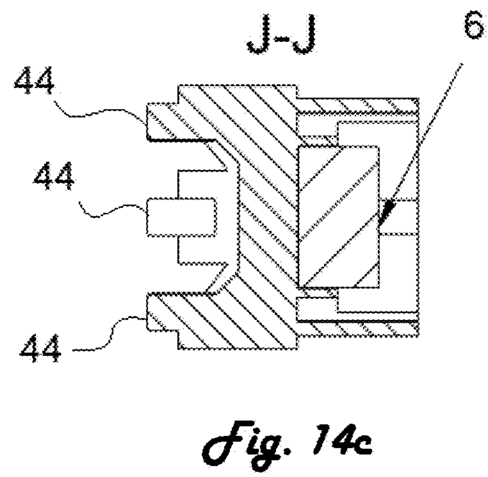
FIG. 14*c* shows the longitudinal section J-J indicated in FIG. 14*b*.
Figures 15A, 15B, 15C:
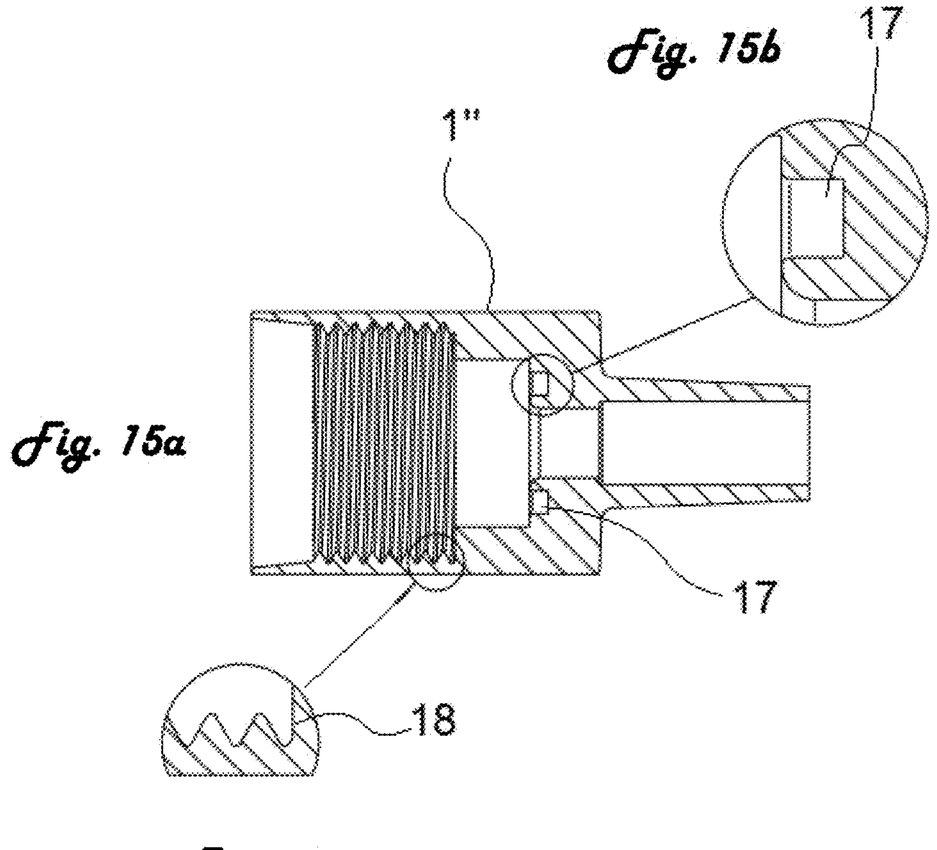
FIG. 15*a* shows a longitudinal section of the downstream part (1") of the fourth embodiment of the invention.
FIG. 15*b* shows a detail of the recess (17) for the upper guide pin.
FIG. 15*c* shows a detail of the thread and stop (18) of the downstream part (1").

The fourth embodiment does not require the use of an o-ring and differs from the third embodiment substantially by the support (4") of the elastomeric material (6), as can be seen in FIG. 14*a*.

The downstream part (1") also has small modifications in relation to the previous embodiment. In this embodiment, the downstream part has recesses (17) to fit the guide pins (44) of the support (4") of elastomeric material.

The elastomeric material support (6) in this embodiment is substantially cylindrical.

The fourth embodiment has arms (41") from which the guide pins (44) emerge, all pins parallel to the axial direction of the retainer, from the direction of displacement of the beverage.

In one embodiment, four guide pins (44) are arranged, each emerging from an arm (41"). The arms (41") and the guide pins (44) are preferably arranged at 90° intervals.

The outer portions of the arms (41") are spare in the radial direction, in order to allow the liquid to flow between the spaces formed between the arms (41").

The inner part of the arms (41") is chamfered, having a cut at an angle of approximately 45° in relation to the longitudinal axial direction. Likewise, this space produced by the cuts in the arms (41") was specially designed so that the liquid flows through them towards the central portion of the part (axial axis) where it will find the exit hole in the spare cylinder (13).

This path taken by the liquid through the support (4") further reduces the turbulence of the liquid, preserving the gas incorporated into the liquid.

In other words, the arrangement of the four arms (41") of the support (4") having their radial projections and chamfers promotes an even better result, minimizing the disincorporation of gas present in the beverage while ensuring laminar flow with minimal turbulence.

The sizings of the third and fourth embodiments are preferred, as they accommodate even better in the main PET bottle models. In addition to being even more economical, they use less material.

That is, the present regulator was designed to allow the maximum possible flow while respecting the dimensional restrictions of the nozzle of the most common bottles found on the market.

Figure 17:
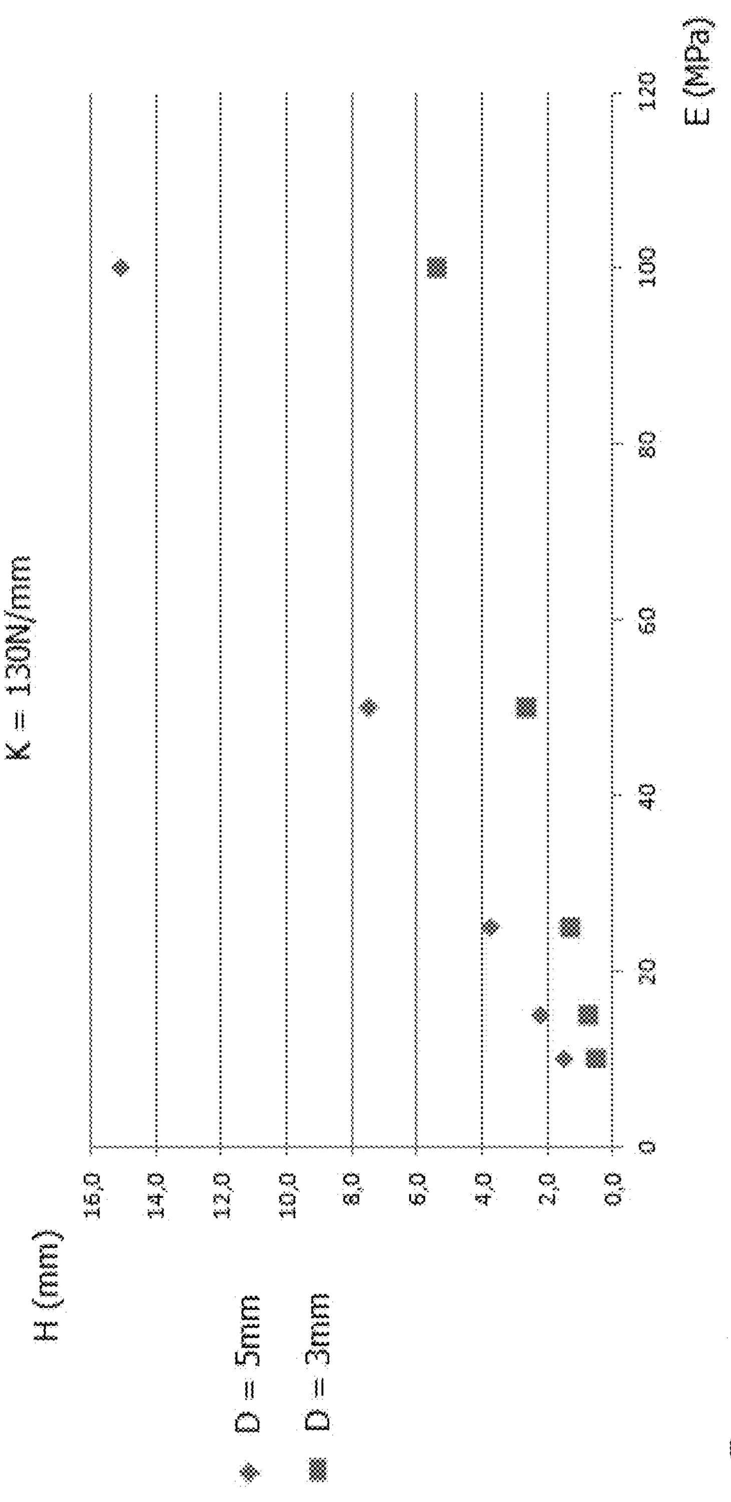
FIG. 17 illustrates an example of a height graph of the elastomeric material per liquid pressure for an elastic constant of approximately 130 N/mm. In this example, the elastomeric material is a cylinder having two diameters of 3 and 5 mm.

The elastic characteristics of the polymer used are dimensioned according to the working pressure of the device, which varies between approximately 0.5 to 6 kgf/cm$^2$. FIG. 17 shows an exemplary graph with some possibilities for the diameter and height of a cylinder of elastomeric material having an elastic constant of approximately 130 N/m.

The gas/liquid volume ratio is sized according to the desired flow rate, which, in turn, conditions the pressure used and, therefore, the characteristics of the polymer. Preferably the flow rate is approximately 40 liters/hour and the pressure range is between 0.5 and 6 kgf/cm$^2$.

The present invention advantageously provides constancy or stability in flow, even when working with a wide pressure range, which is exemplary between 0.5 and 6 kgf/cm$^2$.

The regulator is preferably connected to a distal portion of a siphon or liquid intake tube of a beverage-dispensing valve from the prior art. This prior art beverage-dispensing valve (the type found in bars, but which are also found in portable valves) allow two dispensing modes: without foam and with foam. In other words, the professional who is "serving the beer" pulls the lever forward (towards his body) to dispense the beverage without foam and, at the end, pushes the lever backwards to dispense the beverage with foam.

The regulator of the present invention is preferably used in a beverage-dispensing valve for a portable beverage packaging, giving the consumer the freedom to enjoy a well-made draft beer anywhere.

The device of the present invention works both in pressurized bottles (the main use), however can also be used or adapted in systems with gas supply having external pressure regulation, bringing to these systems the advantage of avoiding sporadic decarbonation of the beverage (which occurs quite frequently). For example, when using household beer taps (and even bars beer taps), it is very common the occurrence of foam jets throughout the operation (even though the gas pressure in the system is regulated externally by a $CO_2$ cylinder). This way, the device could be attached to the siphon that goes inside the beer barrel to prevent decarbonation.

The current dimensions of the device were designed for use in PET bottles, meeting the intended flow rate of 40 L/hour. However, the device can be adapted by a skilled technician to work with different dimensions/flows, simply by changing its dimensions and/or the specifications of the elastomeric cylinder. To do this, the skilled technician simply needs to carry out the appropriate calibrations.

Example of Embodiment

The use of the present invention in a PET bottle is an example of embodiment of the present invention. Thus, a PET bottle having a capacity of 2 liters was filled with 1.9 liters of beverage, for example, draft beer at the usual drinking temperature (approximately 0 to 8° C.).

Once the bottle is filled with liquid, the regulator is coupled to the siphon, which in turn is connected to a beverage-dispensing valve. In this example, for the sake of convenience, the gasification process and the valve for dispensing the beverage that appear in patent document WO 2019126850 were used. However, the carbonation process and release of the beverage can be done in any other way.

Once the bottle is closed, it is pressurized and the liquid in the container can then be consumed.

For a working flow rate of 40 L/h, a common value for conventional beer cooler flows, a pressure of 5.5 $kgf/cm^2$ was used applied to a container having 90% of the volume filled with liquid and the 10% remaining used as a reservoir for gas.

Although the invention has been described in terms of the four preferred embodiments, those skilled in the art will recognize that the invention can be carried out with modifications within the spirit and scope of the claims.

Numerical references marked with a “line”, or an apostrophe merely indicate the embodiment of the invention. However, numerical references should be interpreted broadly in the claims. Thus, even if the claims have numerical references without “line” or apostrophe, they must be interpreted as covering all embodiments or a specific embodiment having the same reference number, regardless of not having the “line” or apostrophe indicative of a specific embodiment.

The invention claimed is:

1. A regulator for controlling the flow of carbonated beverages, provided with:

a main body comprising at least two parts comprising a downstream part, having a cavity and a hole for the exit of the carbonated beverage, and an upstream part, having a cavity and an inlet hole for the carbonated beverage under pressure, or the main body comprising at least three parts comprising the downstream part, the upstream part and a central part having a cavity;

the at least two parts or at least three parts comprise at least two attachable and detachable parts, wherein the at least two parts are equipped with frustum-shaped cavities that accommodate a double conical part, wherein the double conical part comprises an upstream cone portion, the diameter of which increases in the direction of the carbonated beverage flow, and a downstream cone portion, the diameter of which decreases in the direction of the carbonated beverage flow;

wherein the cavity of the downstream part or the cavity of the central part, or both, have the shape of a frustum-cone, and have their internal walls with the same inclination, in relation to a longitudinal axis, as the downstream cone portion;

wherein the cavity of the upstream part in the shape of a frustum-cone has its internal walls having the same inclination, in relation to the longitudinal axis, as the upstream cone portion;

wherein an end of the downstream cone portion transfers the force exerted by the carbonated beverage pressure on the upstream cone portion, including the force exerted on a convex end of the upstream cone portion of the double conical part, to an elastomeric material that deforms depending on the pressure of the carbonated beverage;

wherein the elastomeric material is also housed in a support coupled to the downstream part or in a movable support coupled to the downstream part;

the carbonated beverage flows through a space formed between the movable support for the elastomeric material and the cavity of the downstream part or the central part, or at a junction between the downstream part and the central part;

the movable support for the elastomeric material is cylindrical and is equipped with arms that project in the radial direction of the movable support and accommodate themselves in cuts of the main body;

the arms also project in an axial direction in the direction of the flow of the carbonated beverage; and the arms are provided with guide pins being smaller in width than the arms and projecting in the axial direction, but in the opposite direction to the flow of the carbonated beverage, and the guide pins are accommodated in recesses arranged in the cuts.

2. The regulator for controlling the flow of carbonated beverages, according to claim 1, wherein the double conical part is also provided with a straight portion where fins are arranged that fit in guides of the downstream part or in guides of the central part.

3. The regulator for controlling the flow of carbonated beverages, according to claim 1, wherein the elastomeric material has a cylindrical shape, having a diameter that is between 3 to 12 mm and its height is between 1 to 8 mm, having an elastic constant between 70 and 190 N/mm.

4. The regulator for controlling the flow of carbonated beverages, according to claim 1, wherein the movable support is provided with four arms.

5. The regulator for controlling the flow of carbonated beverages, according to claim 1, wherein the regulator works in a pressure range of 0.5 to 6 $kgf/cm^2$.

6. The regulator for controlling the flow of carbonated beverages, according to claim 1, wherein said regulator is connected to a siphon or liquid intake tube of a beverage-dispensing valve.

7. The regulator for controlling the flow of carbonated beverages, according to claim 6, wherein said regulator is connected to a distal portion of the siphon or liquid intake tube of the beverage-dispensing valve.

8. The regulator for controlling the flow of carbonated beverages, according to claim 6, wherein the beverage-dispensing valve allows two dispensing modes: without foam and with foam.

9. The regulator for controlling the flow of carbonated beverages, according to claim 6, wherein the beverage-dispensing valve is for a portable beverage packaging.

* * * * *